UNITED STATES PATENT OFFICE.

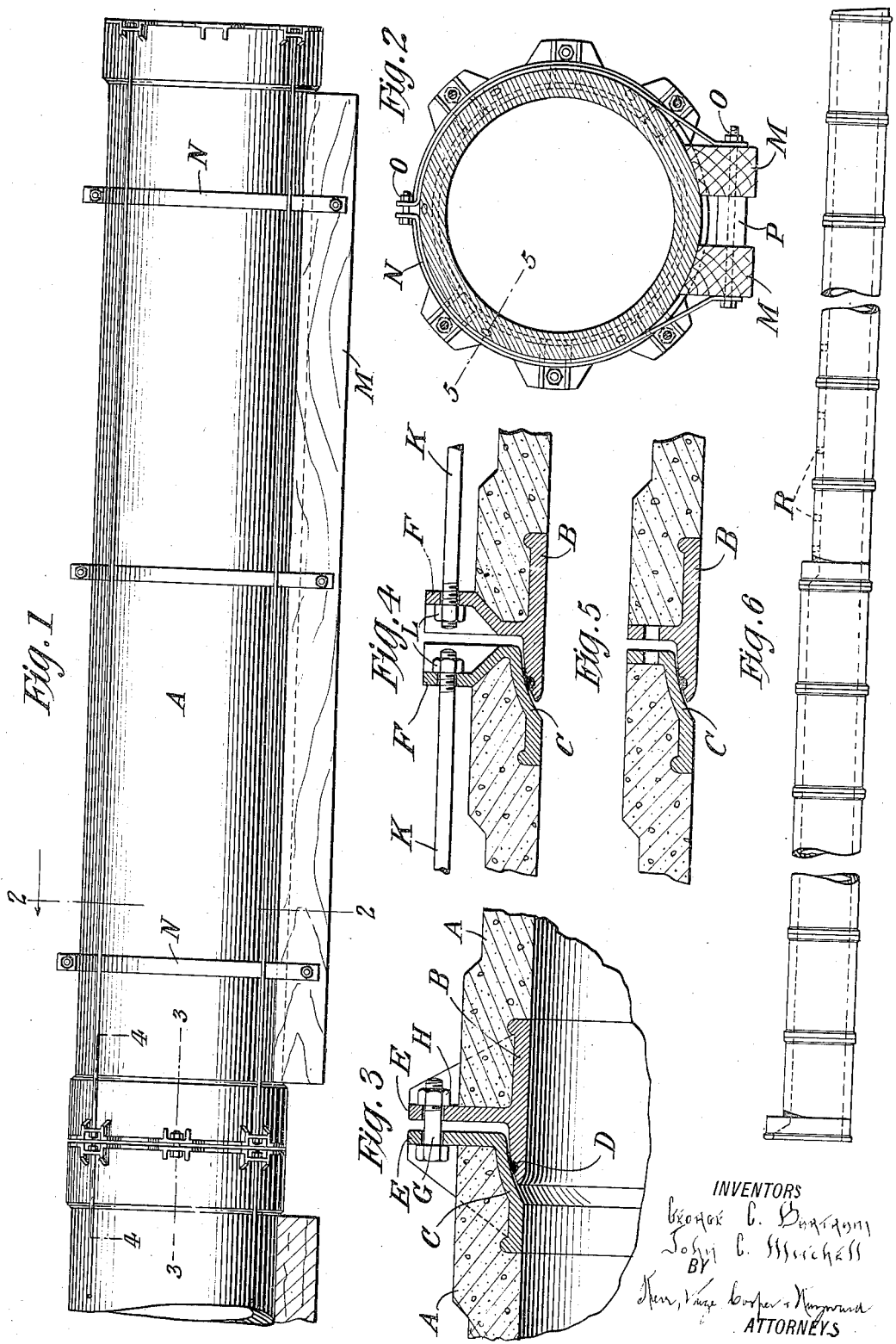

JOHN C. MITCHELL AND GEORGE C. BARTRAM, OF EAST ORANGE, NEW JERSEY.

CONCRETE DRAIN-PIPE.

1,293,163. Specification of Letters Patent. Patented Feb. 4, 1919.

Application filed December 28, 1917. Serial No. 209,313.

*To all whom it may concern:*

Be it known that we, JOHN C. MITCHELL and GEORGE C. BARTRAM, citizens of the United States, residing at East Orange, in the county of Essex and State of New Jersey, have invented certain new and useful Improvements in Concrete Drain-Pipes, of which the following is a full, clear and exact description.

This invention is an improvement in the construction of what are known as subaqueous pipes, that is to say pipes which are laid on the bottom of a body of water to convey fluids to a more or less remote point. For example the western cities on the Great Lakes discharge their sewage into the lakes through subaqueous pipes running from the shore to a greater or less distance out into the body of water.

The invention resides in a device for reinforcing relatively long lengths of such pipe to properly maintain their integrity while being laid.

In the drawings hereto annexed Figure 1 is a view in elevation of a pipe section with a portion of an abutting section.

Fig. 2 is a sectional view on the line 2—2 of Fig. 1.

Fig. 3 is an enlarged detailed view in section of the improved joint showing the means for binding two sections of pipe together.

Fig. 4 is a similar view at another part of the joint showing the longitudinal reinforcements for the sections.

Fig. 5 is a sectional view on line 5—5 of Fig. 2, and

Fig. 6 is a view in elevation of the end of a conduit composed of the pipes shown in the preceding figures.

We construct the pipe sections of reinforced concrete and form them in suitable molds. One of such sections is designated A in Fig. 1 and may be molded in one piece, or composed of a number of short lengths united by joints of ordinary construction, but for the sake of simplicity we may regard each section as composed of one solid length of pipe.

When these sections are formed by molding, metal members B, C, generally of iron, are introduced into the ends of the molds and the concrete packed in upon or around them. These members are essentially the male and female elements of a ball and socket joint, that is to say member B is a spigot and member C is a bell, the contacting surfaces of which are rounded to conform to arcs of circles of relatively large diameter, so that when two sections are joined there will be provision for a limited movement of one with respect to the other without impairment of the joint.

In order to secure a more perfectly tight joint a groove D is formed in the spigot member which may be filled with any suitable filling or packing material, plastic or otherwise, to make a tighter joint.

From the two members B and C extend arms or lugs E and F which register when the sections are formed, and are provided with eyes. The dimensions of the parts are such that the pipe ends are separated by a short space, which permits of a certain play, and when two abutting sections are brought together, bolts G and nuts H are employed to secure the registering lugs E together and thus bind the two adjacent sections, while longitudinal reinforcing rods K and nuts L are used to tie the lugs F of each section together.

When these pipes are laid under water substantially the only operation required is the binding together of abutting sections by the bolts G, but as the sections are relatively long and, as stated, may be composed of several independent parts, they should be strongly reinforced against stresses, for which purpose we lay each section on two wooden beams M, and secure them firmly thereto by straps or bands N, secured to the beams by bolts O. Any suitable spacing blocks P may be used in connection with these bolts.

When a line of this pipe is used to carry municipal sewage out into a body of water, it is desirable that the outlying end be gradually reduced in diameter and provided where it begins to become smaller with numerous vents or openings through which its contents may be gradually discharged.

Such an arrangement is shown in Fig. 6, where the bottom of the sections are maintained in alinement but the upper portions from the joint on, are by means of contractions in the molds, reduced in size to make in effect a tapered conduit. These sections of reduced capacity are provided with a line or lines of perforations R, through which the contents may gradually flow out.

Pipe lines of this character may be readily laid and have proved to be of great practical value. Uneven settling is amply provided for, and a durable and efficient conduit secured.

What we claim is:

1. A pipe line composed of sections of concrete of relatively great length united end to end, each section resting upon longitudinal timbers to which it is secured as by means of straps.

2. The combination with an elongated section of concrete pipe of a timber reinforcement laid under the same and straps surrounding the pipe and bolted to the said reinforcement.

In testimony whereof we hereunto affix our signatures.

JOHN C. MITCHELL.
GEORGE C. BARTRAM.